United States Patent
Eiselt

(10) Patent No.: US 6,792,209 B1
(45) Date of Patent: Sep. 14, 2004

(54) METHOD AND SYSTEM FOR REDUCING NON-LINEAR CROSS TALK IN LOW DISPERSION OPTICAL FIBER

(75) Inventor: Michael Herbert Eiselt, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/469,928

(22) Filed: Dec. 22, 1999

(51) Int. Cl.[7] .............................................. H04J 14/02
(52) U.S. Cl. ........................ 398/81; 398/43; 398/147
(58) Field of Search ..................... 359/161, 7; 385/123, 385/24, 28, 15; 398/9, 1, 185, 27, 147, 81; 356/73.1

(56) References Cited

U.S. PATENT DOCUMENTS

| | | | | |
|---|---|---|---|---|
| 5,559,920 A | * | 9/1996 | Chraplyvy et al. | 385/123 |
| 5,619,320 A | * | 4/1997 | Eiselt et al. | 356/73.1 |
| 5,677,780 A | * | 10/1997 | Nuyts | 398/27 |
| 5,956,440 A | * | 9/1999 | Mikami et al. | 359/124 |
| 6,005,702 A | * | 12/1999 | Suzuki et al. | 359/124 |
| 6,137,604 A | * | 10/2000 | Bergano | 359/124 |
| 6,181,449 B1 | * | 1/2001 | Taga et al. | 359/124 |
| 6,204,949 B1 | * | 3/2001 | Ishikawa et al. | 359/135 |
| 6,239,890 B1 | * | 5/2001 | Leclerc | 359/110 |
| 6,307,985 B1 | * | 10/2001 | Murakami et al. | 359/109 |
| 6,339,665 B1 | * | 1/2002 | Danziger | 359/161 |

OTHER PUBLICATIONS

Michael Eiselt, "Does Spectrally Periodic Dispersion Compensation Reduce Non–Linear Effects?," published Sep., 1999.

Giovanni Bellotti et al., "Cross–Phase Modulation Suppressor for Multispan Dispersion–Manager WDM Transmission," published Sep., 1999.

Kyo Inone, "Suppression Technique for Fiber Four–Wave Mixing Using Optical Multi/Demultiplexers and a Display Line," IEEE Journal of Lightwave Tech., vol. 11, No. 3, 3/93.

* cited by examiner

Primary Examiner—Leslie Pascal
Assistant Examiner—David C. Payne

(57) ABSTRACT

A method and system for channel-by-channel dispersion compensation mitigate inter-channel interference. Interchannel cross-talk is reduced by introducing a walk-off between the transmission channels after each amplified transmission span. A compensator assemblage comprises a first compensator that is an ODC dispersion compensator and a second compensator that is a channel-by-channel dispersion compensator. While the dispersion introduced into each channel by the first compensator is annihilated by the second compensator, the walk-off between the channels, introduced by the first compensator remains. As a result, the effects of non-linear inter-channel interference are mitigated.

16 Claims, 2 Drawing Sheets

METHOD AND SYSTEM FOR REDUCING NON-LINEAR CROSS TALK IN LOW DISPERSION OPTICAL FIBER

BACKGROUND OF THE INVENTION

1. Field of Invention

The present invention relates to reduction of non-linear cross-talk in low dispersion fiber. More specifically, non-linear cross-talk is reduced by introducing walk-off between transmission channels.

2. Description of Related Art

For high-capacity, long-haul data transmission, two effects pose a limit to the capacity of a Wave Division Multiplexed (WDM) system. First, chromatic dispersion of the transmission fiber limits the bit-rate per channel. Second, non-linear inter-channel cross talk limits the number of WDM channels that can be transmitted simultaneously.

Chromatic dispersion in standard, single-mode fiber (SMF) and, for larger systems, in non-zero, dispersion-shifted fiber (NZDSF), distorts the transmission of high bit rate signals. Dispersion compensating fibers as well as chirped fiber gratings are popular compensation methods for such distortion. Both techniques effectively compensate for the accumulated dispersion of the transmission system, and thus, erase the temporal broadening of a signal pulse.

Chromatic dispersion of the transmission fiber requires dispersion compensation over the optical bandwidth of each channel. However, conventional dispersion compensation schemes, e.g., dispersion compensating fibers or chirped fiber gratings, perform dispersion compensation over the whole bandwidth of the WDM system implementing overall dispersion compensation (ODC). As a result, such schemes compensate for dispersion in the bandwidth between transmission channels.

However, the effect of non-linear cross talk worsens when dispersion compensation between the transmission channels is performed. Chromatic dispersion causes the signals in different WDM channels to travel at different speeds, which reduces the impact of non-linear cross talk due to averaging. It is well known that using fiber with a low chromatic dispersion coefficient D, e.g., less than 1 pico-second per kilometer-nanometer (psec/km·nm), for transmission of a WDM signal results in signal distortion due to non-linear inter-channel effects, e.g., four-wave mixing and cross-phase modulation. The lower the dispersion value D, the closer the coupling between different WDM channels and the larger the interfering cross-talk.

Non-linear inter-channel effects can be mainly attributed to two relationships. First, a low dispersion coefficient enhances "phase matching" between channels and causes interfering four-wave mixing products. Second, as the channels propagate with nearly the same velocity, no walk-off between the channels occurs. Walk off is a de-correlation in the transmission velocity of the bits of data in neighboring WDM channels. As a result, interference in consecutive fiber spans always occurs between the same signal bits. Thus, cross-channel interference accumulates more rapidly. Therefore, mitigating the impact of non-linear cross talk is one benefit of chromatic dispersion in optical fiber spans.

As a result, implementation of dispersion compensation techniques causes an increase of the detrimental effects of non-linear cross talk. One way of mitigating the effects of non-linear cross talk is to increase the separation band between transmission channels. As a result, the effects of conventional implementation of chromatic dispersion techniques often must be offset by using a larger frequency separation between the WDM channels.

Alternatively, other conventional dispersion compensating devices perform channel-by-channel compensation (CCC) of dispersion, thereby eliminating dispersion compensation in the bandwidth between transmission channels. Such devices are also more compact than devices compensating the dispersion of a whole transmission band. Operation of such devices can be extended towards a tunable amount of dispersion. Nevertheless, larger frequency separation between the WDM channels is still necessary to mitigate the effects of non-linear cross talk between transmission channels.

Additionally, new fiber types having higher chromatic dispersion coefficients, e.g., greater than 1 psec/km·nm, have increased the dispersion in the transmission-band while, at the same time, keeping it low enough to not require dispersion compensation. Such fibers have a zero-dispersion wavelength between 1450 nm (TW-RS, Lucent) and 1510 nm (E-LEAF, Corning). While the capacity of those fibers is sufficiently high for WDM transmission in the C-band, future operation in the S-band presents problems due to the low chromatic dispersion in this S-band wavelength range.

However, the channel count in announced WDM systems is 160 or 240 channels. This high channel count can only be obtained, when the channels are packed very closely, i.e., with a channel separation of 50 GHz or 100 GHz, and transmission bands in addition to the conventional C-band, i.e., 1530–1565 mn, are used. However, future WDM systems will operate in the L-band, i.e., 1570 nm–1620 nm, and S-band, i.e., 1440 nm–1500 nm. Nevertheless, such future systems will face severe restrictions on the usability of the new transmission bands because of the infrastructure of presently deployed fiber system architectures.

SUMMARY OF THE INVENTION

To more effectively handle such operation, the present invention provides a method and system for channel-by-channel dispersion compensation that mitigates inter-channel interference. Through transmission simulations, it has now been established that inter-channel cross-talk can be partly reduced by introducing a walk-off between the channels after each amplified transmission span. The present invention reduces inter-channel cross-talk by introducing a walk-off between the channels after each amplified transmission span.

In a first exemplary embodiment of the invention a compensator assemblage comprises a first compensator that is an ODC dispersion compensator, e.g., dispersion compensating fiber, chirped fiber grating, introducing dispersion D and a second compensator that is a channel-by-channel dispersion compensator introducing dispersion −D. While the dispersion D, which is introduced into each channel of an optical link by the first compensator, is annihilated by the second compensator, the walk-off between the channels, introduced by the first compensator, remains. As a result, the effects of non-linear inter-channel interference are mitigated. The first exemplary embodiment is preferably implemented in a WDM network having no need for compensation mechanisms implemented for the purpose of compensating for dispersion.

A second exemplary embodiment is preferably implemented in a WDM network having need for compensation mechanisms implemented for the purpose of compensating for dispersion D, which is produced in the network as a result of dispersive fiber spans used to transmit data. Accordingly, in the second exemplary embodiment of the invention, a first compensator is utilized for the purpose of performing ODC by introducing dispersion −D. However, the amount of dispersion introduced by the ODC is offset by an offset value δ. Therefore, the amount of dispersion introduced by the first compensator is −D+δ. A second compensator which is a channel-by-channel dispersion compensator introduces a dispersion −δ. While the +δ, which is introduced into each channel by the first compensator, is annihilated by the second compensator introducing dispersion −δ, the walk-off between the channels, introduced by the first compensator, remains along with the dispersion −D provided by the first compensator. As a result, the effects of non-linear inter-channel interference are mitigated while the level of dispersion D in the WDM network is annihilated by the dispersion −D provided by the first compensator.

BRIEF DESCRIPTION OF THE DRAWINGS

The exemplary embodiments of this invention will be described in detail, with reference to the following figures, wherein.

DETAILED DESCRIPTION OF PREFERRED EMBODIMENTS

Figure 1:
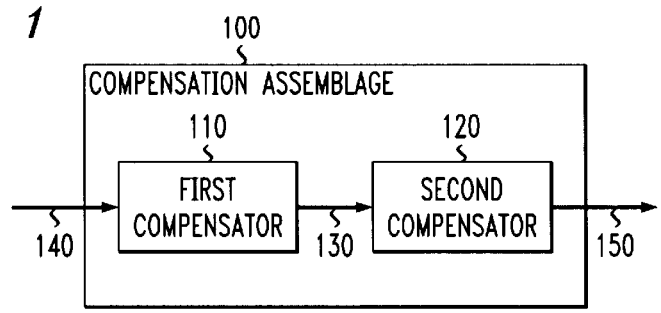
FIG. 1 illustrates a compensation assemblage in accordance with the exemplary embodiments of the invention.

Dispersion compensation in a channel-by-channel configuration is well known and commercially available. Chromatic dispersion compensation annihilates the bit-walk off between WDM channels, exacerbating non-linear inter-channel effects. Bit walk-off is a WDM data transmission effect in which data bits shift position in relation to other data bits during propagation of a WDM signal in an optical WDM fiber. The first exemplary embodiment of the present invention injects bit walk-off between transmission channels. The second exemplary embodiment of the present invention provides dispersion compensation while maintaining bit walk-off between transmission channels.

Using chromatic dispersion compensation devices to affect non-linear effects has not been considered. Moreover, using channel-by-channel dispersion compensation technology to reduce non-linear cross-talk has not been considered. Nevertheless, a reduction of non-linear cross-talk reduces the cross-talk power penalty in a transmission system and increases the system margin, which, in turn allows for an increase in span losses, added system capability or increased signal strength.

Although the technology of channel-by-channel dispersion compensation is conventionally known, the present invention uses channel-by-channel dispersion compensation to reduce non-linear effects. As different channels in a WDM transmission system travel at different velocities, the bits in neighboring channels are de-correlated during propagation due to a walk-off effect. Non-linear effects between the bits in different channels are averaged in consecutive fiber spans within the network system.

However, when the dispersion of the fiber is compensated, the relative position of the bits is realigned as well. Because non-linear effects always occur between the same set of bits, they are not averaged and merely accumulate faster. The present invention provides a solution to this adverse effect of dispersion compensation by compensating for dispersion on a channel-by-channel basis without compensating the temporal shift between the channels.

Although conventionally, several methods that accomplish channel-by-channel dispersion compensation are available, none of these methods utilize the dispersion compensation to affect non-linear cross talk. Conventional techniques for dispersion compensation avoid the need to multiplex the WDM channels by making use of periodic transfer functions. These periodic dispersion compensators are generally smaller than those covering the whole transmission band. However, as channel wavelengths must coincide precisely with compensator wavelengths, such periodic dispersion compensators often require active device control.

In the present invention, dispersion compensation is performed on both a channel-by-channel basis as well as overall dispersion compensation basis.

In WDM systems over fiber with a higher dispersion, dispersion compensation can also lead to an effective annihilation of the walk-off between the channels. The methods and systems in accordance with the exemplary embodiments of the invention can be implemented to introduce additional walk-off. However, it is more economical to use a channel-by-channel dispersion compensator alone to compensate for the chromatic dispersion of the transmission fiber than using a different way of dispersion compensation, e.g., dispersion compensation fiber throughout the system. Therefore, in regard to economic feasibility, the first exemplary embodiment of the invention is more preferred than the second.

The first exemplary embodiment of the invention is preferably implemented in networks, in which a dispersion compensator is unnecessary, e.g., wherein low dispersion fiber is used for fiber spans that transmit data throughout the network. The tandem operation of the first and second compensators act to inject walk-off without altering the level of dispersion within the network.

FIG. 1 illustrates a compensation assemblage 100 designed in accordance with the exemplary embodiments of the invention. Compensation assemblage 100 comprises a first compensator 110 and a second compensator 120 coupled by a multi-channel transmission line 130. The first compensator 110 is an ODC dispersion compensator, e.g., dispersion compensating fiber, chirped fiber grating, introducing dispersion D to the multi-channel transmission line. The first compensator 110 receives signals from a transmission line 140 coupled to the first compensator 110 and part of an optical data transmission network. The second compensator 120 is a channel-by-channel dispersion compensator that introduces dispersion −D to the multi-channel transmission line. The second compensator 120 outputs signals to a transmission line 150 coupled to the second compensator and part of an optical data transmission network.

While the dispersion D, introduced into each channel of the multi-channel transmission line 130 by the first compensator 110 is annihilated by the second compensator 120, the walk-off between the transmission channels introduced via compensation performed by the first compensator 110 remains. As a result, the effects of non-linear inter-channel interference are mitigated.

The first exemplary embodiment is preferably implemented in a WDM network having no need for compensation mechanisms implemented for the purpose of compensating for dispersion. For example, the first exemplary embodiment may be utilized in a WDM network having a dispersion less than 1 psec/km·nm.

The amount of dispersion D introduced by the first compensator must be large enough that the associated walk-off between two neighbor channels is larger than one bit period. Such a requirement provides sufficient de-correlation between the channels.

Implementation of a second exemplary embodiment is preferable when characteristics of the WDM network are such that a dispersion compensator is needed for the purpose of compensating dispersion, e.g., when a dispersive fiber with a dispersion coefficient greater than 1 pico-second per kilometer-nanometer (psec/km·nm) is used in the transmission system. In such a situation an additional dispersion compensation mechanism, e.g., dispersion compensating fiber or an additional dispersion compensator, beyond what is used to provide walk-off is utilized. Although a compensation assemblage in accordance with the first exemplary embodiment may be used in such a situation to introduce additional walk-off, it would be more economical to forego adding an additional dispersion mechanism beyond the first compensator of the compensator assemblage. As a result, the second exemplary embodiment of the invention provides a compensator assemblage that introduces a necessary ODC dispersion compensation and annihilates only a portion of the ODC dispersion introduced by the additional dispersion compensation mechanism without affecting the walk-off between channels provided by that mechanism.

Because both exemplary embodiments utilize a compensation assemblage that includes two compensators, the second exemplary embodiment of the invention will be explained with reference to FIG. 1. The compensation assemblage designed in accordance with the second exemplary embodiment is preferably utilized in a dispersive transmission system in which dispersive fiber, e.g., with a dispersion coefficient D, is utilized. Accordingly, the first compensator 110 is an ODC dispersion compensator, e.g., dispersion compensating fiber, chirped fiber grating, introducing dispersion $-D+\delta$, where $$\delta > \frac{1000}{R_B \cdot \Delta\lambda},$$

where $\delta$ is the dispersion difference in ps/nm, $R_B$ is the minimum channel bit rate in Gb/s, and $\Delta\lambda$ is the system's minimum channel separation in nm. The first compensator 110 receives signals from a transmission line 140 coupled to the first compensator 110 and part of an optical data transmission network. The second compensator 120 is a CCC dispersion compensator with dispersion $-\delta$. The second compensator 120 outputs signals to a transmission line 150 coupled to the second compensator and part of an optical data transmission network.

The amount of dispersion compensation provided by the first compensator 110 $-D$ is offset by an offset value $\delta$, which is opposite to the amount of compensation performed by the second compensator 120, $-\delta$. Therefore, the amount of dispersion introduced by the first compensator 110 is $-D+\delta$. The second compensator 120 introduces dispersion $-\delta$. While the dispersion $+\delta$, which is introduced into each channel by the first compensator 110, is annihilated by the second compensator 120, the walk-off between the channels, introduced by the first compensator 110, remains along with the dispersion $-D$ provided by the first compensator 110. As a result, the dispersion $-D$ annihilates the dispersion D of the dispersive fiber system, and the effects of non-linear inter-channel interference are mitigated.

Figure 2:
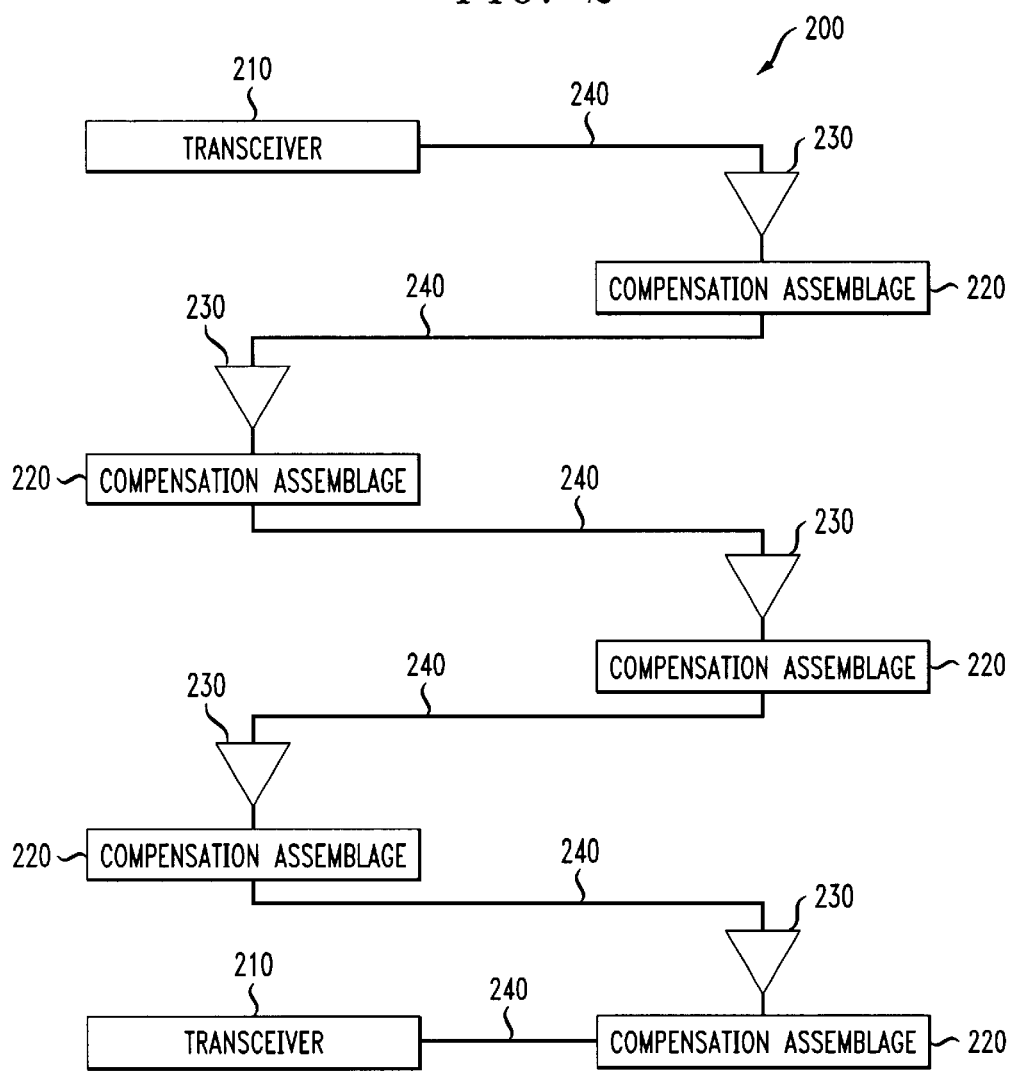
FIG. 2 illustrates one potential configuration of a data transmission system incorporating compensation assemblages in accordance with the exemplary embodiments of the invention.

FIG. 2 illustrates a diagram of a WDM network 200 provides communication between two transceivers 210. In the network 200, transceivers 210 are coupled together via optical fiber spans 240 coupled together with compensation assemblages 220 coupled to optical amplifiers 230. In accordance with the first exemplary embodiment, the compensation assemblage 220 includes two compensators. Also, in the first embodiment the optical spans 240 are composed of low-dispersion fiber. In accordance with the second exemplary embodiment, the compensation assemblage 220 includes a single compensator and the optical fiber spans 240 are composed of dispersive fiber.

Although the compensation assemblages may be used throughout a WDM network, it is preferable that a compensation assemblages be coupled to optical amplifiers used throughout the WDM network. It is preferable that the compensation assemblages are coupled between optical fiber spans and optical amplifiers so as to perform pre-transmission compensation of an optical signal after it has been amplified by an optical amplifier but before it is transmitted on the optical fiber span, for example, as shown in FIG. 2.

Alternatively, the compensation assemblages may be coupled between an optical fiber span and an optical amplifier so as to perform post-transmission compensation of an optical signal following its transmission from the optical fiber span but before its amplification by the optical amplifier. Two compensation assemblages may also be positioned so as to bank an optical amplifier so that an optical signal is exposed to both pre-transmission and post-transmission compensation. Additionally, the compensation assemblages may be placed between a pre-amplifier and a post, or power, amplifier used in a transmission system.

Simulations of conventional WDM systems have indicated that the transmission penalty resulting from chromatic dispersion and non-linear cross talk can be as high as 3 dB. Simulations of implementation of compensation assemblages designed in accordance with the exemplary embodiments of the invention have indicated that, by using the present invention, the penalty can be reduced a by a factor of two. Simulations were performed with an 8 channel WDM system with a channel separation of 100 GHz. In accordance with the first exemplary embodiment, such simulations revealed that the introduction of walk-off between the channels has a beneficial effect for fiber chromatic dispersion values at the central wavelength of the eight channels up to about 0.3 ps/nm/km and power levels of up to 3 dBm per channel for both 2.5 Gb/s and 10 Gb/s signals. For devices designed in accordance with the second exemplary embodiment, such simulations revealed that the introduction of walk-off between the channels has a beneficial effect for all dispersion values and power levels above 0 dBm per channel.

Figure 3:
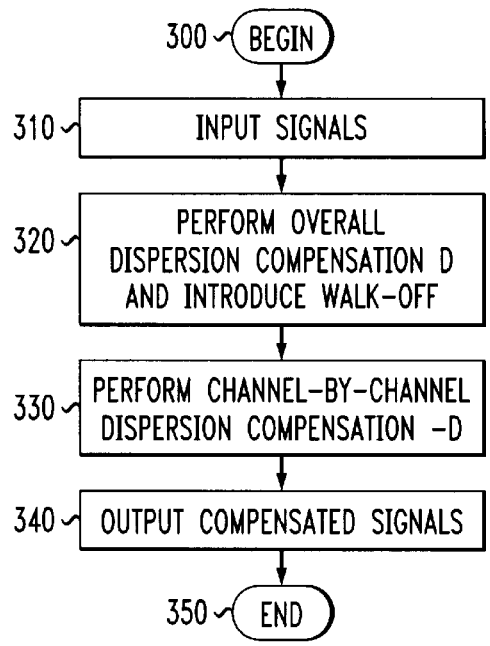
FIG. 3 illustrates a method for compensation in accordance with the first exemplary embodiment of the invention.

FIG. 3 illustrates a method for performing dispersion compensation in accordance with the first exemplary embodiment of the invention. As shown in FIG. 3, the method begins in step 300 and proceeds to step 310. Instep 310, signals are input to an ODC dispersion compensator. Control then proceeds to step 320, in which an ODC dispersion compensation with dispersion D is introduced to provide ODC dispersion compensated signals and control proceeds to step 330. Step 320 injects walk-off between the channels upon which the input signal travels as well as providing dispersion compensation. In step 330, CCC dispersion compensation is performed to introduce dispersion −D to the ODC dispersion compensated signals and control proceeds to step 340. Step 330 annihilates the dispersion D introduced by step 320 without affecting the associated walk-off between channels. In step 340, the signals resulting from step 340 is output and control proceeds to step 350, in which the method ends.

Figure 4:
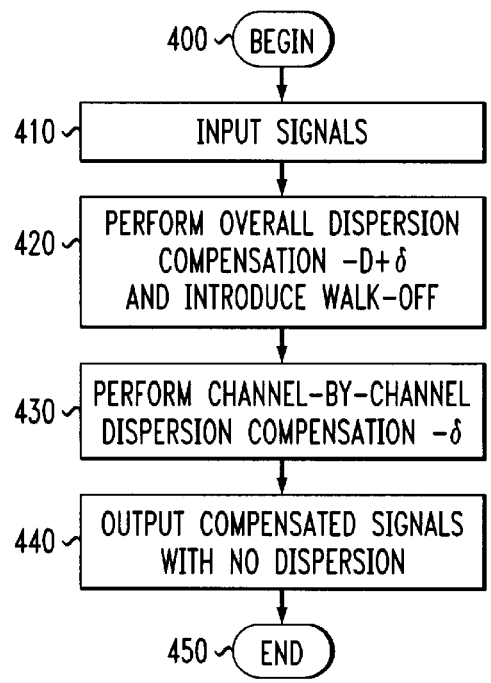
FIG. 4 illustrates a method for compensation in accordance with the second exemplary embodiment of the invention.

FIG. 4 illustrates a method for performing dispersion compensation in accordance with the second exemplary embodiment of the invention. As shown in FIG. 4, the method begins in step 400 and proceeds to step 410. In step 410, signals are input to an ODC dispersion compensator. Control then proceeds to step 420, in which an ODC dispersion compensation with dispersion −D+δ is performed on the input signals to provide an ODC dispersion compensated signal and control proceeds to step 430. Step 420 injects walk-off between the channels upon which the input signals travel as well as providing dispersion compensation. In step 430, CCC dispersion compensation with dispersion −δ is performed on the ODC dispersion compensated signals and control proceeds to step 440. Step 430 annihilates the dispersion +δ introduced by step 420 so that the dispersion compensation of dispersion −D is effected as a result of steps 420 and 430 without affecting the walk-off between channels resulting from the dispersion +δ. In step 440, the signals resulting from step 440 is output and control proceeds to step 450, in which the method ends.

While this invention has been described in conjunction with the specific embodiments outlines above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

For example, it should be appreciated that the amounts of dispersion ±D and ±δ may change as a result of network conditions or requirements. Both exemplary embodiments may be utilized in conjunction with and coupled to a dispersion compensator controller that controls the amount of dispersion compensation introduced to the transmission channels. Such a controller would provide the ability to dynamically control the amount and type of compensation provided by the dispersion compensator assemblage based on the effects of the compensator assemblage, e.g., in a feedback configuration, and/or the transmission requirements of the system.

Therefore, it should be appreciated that such a dispersion compensator controller utilized in conjunction with the second exemplary embodiment may control the amount of dispersion as a constant level −D+δ or control the amount of dispersion −D+δ to change as a result of information provided by the second compensator 220 or any other presently utilized or later developed mechanism that provides channel and network condition information. Alternatively, such a dispersion compensator controller may be coupled to a sensor or transmission link within the optical network that provides information that the dispersion compensator controller may used to alter the amount of compensation performed by the first compensator 210. In such a situation, the dispersion δ could remain constant while the amount of dispersion D could change as a result of known network or channel conditions.

Additionally, the exemplary embodiments of the present invention is particularly useful when used by telecommunication service providers using transport network systems with large bit rates on the order of 10 Gigabit/sec. This is because such systems make dispersion compensation unavoidable.

Also, there is no strict requirement that overall dispersion compensation be performed prior to performing channel by channel dispersion compensation. Accordingly, the positions of the CCC and the ODC may be exchanged.

While the present invention has been described with reference to specific illustrative embodiments, it is not confined to the specific details set forth, but is intended to cover such modifications or changes as may come within the scope of this invention.

What is claimed is:

1. A data transmission method comprising:

inputting input optical data signals on a first optical link;

performing overall dispersion compensation to introduce a first amount of dispersion to the first optical link to output overall dispersion compensated data signals on the first optical link and also to introduce a walk-off between transmission channels of the first optical link such that the walk-off between two neighboring channels of the first optical link is larger than 1 bit;

performing channel-by-channel dispersion compensation on the first optical link to introduce a second amount of dispersion to the first optical link carrying the overall dispersion compensated data signals to provide channel-by-channel compensated data signals and to cancel at least part of said first amount of dispersion; and outputting the channel-by-channel compensated data signals on a second optical link.

2. The method of claim 1, wherein the first amount of dispersion and the second amount of dispersion are opposites of each other.

3. The method of claim 1, wherein the second amount of dispersion is −δ and the first amount of dispersion is −D+δ.

4. The method of claim 1, wherein the method is performed in a WDM network having no need for compensation mechanisms implemented for the purpose of compensating for dispersion.

5. The method of claim 1, wherein the method is performed in a WDM network having a need for compensation mechanisms implemented for the purpose of compensating for dispersion.

6. The method of claim 1, wherein the step of performing overall dispersion compensation is performed using a dispersion compensating fiber.

7. The method of claim 1, wherein the step of performing overall dispersion compensation is performed using a chirped fiber grating.

8. A compensator assemblage comprising:

a first compensator that is an overall dispersion compensator introducing a first amount of dispersion to an optical link carrying input optical data signals to output first dispersion compensated signals and also introducing a walk-off between transmission channels of the first optical link such that the walk-off between two neighboring channels of the first optical link is larger than 1 bit; and a second compensator, coupled to and receiving the first dispersion compensated signals from the first compensator, the second compensator being a channel-by-channel dispersion compensator which compensates each channel received from the first compensator for dispersion, and which introduces a second amount of dispersion to the optical link to cancel at least part of said first amount of dispersion, to output the channel-by-channel compensated data signals on a second optical link.

9. The compensator assemblage of claim 8, wherein the first amount of dispersion and the second amount of dispersion are opposites of each other.

10. The compensator assemblage of claim 8, wherein the second amount of dispersion is $\delta$ and the first amount of dispersion is $-D+\delta$.

11. A WDM network comprising the compensator assemblage of claim 8 and a plurality of optical links including the optical link, wherein the compensator assemblage is coupled between the optical link and another optical link.

12. The WDM network of claim 11, further comprising a plurality of compensator assemblages each coupling at least two optical links.

13. The WDM network of claim 11, wherein the WDM network has no need for compensation mechanisms implemented for the purpose of compensating for dispersion.

14. The WDM network of claim 11, wherein the network has a need for compensation mechanisms implemented for the purpose of compensating for dispersion.

15. The compensator assemblage of claim 8, wherein the first compensator is a dispersion compensating fiber.

16. The compensator assemblage of claim 8, wherein the first compensator is a chirped fiber grating.

* * * * *